United States Patent [19]

Braun

[11] Patent Number: 5,511,437
[45] Date of Patent: Apr. 30, 1996

[54] COMPOUND VEHICULAR TRANSMISSION

[75] Inventor: Eugene R. Braun, Royal Oak, Mich.

[73] Assignee: Eaton Corporation, Cleveland, Ohio

[21] Appl. No.: 284,926

[22] Filed: Aug. 2, 1994

Related U.S. Application Data

[63] Continuation-in-part of Ser. No. 86,149, Jul. 1, 1993, Pat. No. 5,385,066.

[51] Int. Cl.$^6$ .............................. F16H 37/00; F16H 3/02
[52] U.S. Cl. .................................. 74/331; 74/333; 74/745
[58] Field of Search .............................. 74/375, 331, 333, 74/745

[56] References Cited

U.S. PATENT DOCUMENTS

| | | | |
|---|---|---|---|
| 4,388,843 | 6/1983 | Teeter | 74/745 |
| 4,428,247 | 1/1984 | Young | 74/331 |
| 4,754,665 | 7/1988 | Vandervoort | 74/745 |
| 4,831,894 | 5/1989 | Braun | 74/745 |
| 4,966,048 | 10/1990 | Braun | 74/745 |
| 5,062,313 | 11/1991 | Fletcher | 74/335 |
| 5,105,675 | 4/1992 | Langford et al. | 74/335 |
| 5,231,895 | 8/1993 | Stine | 74/745 |
| 5,383,374 | 1/1995 | Reynolds | 74/745 X |
| 5,385,066 | 1/1995 | Braun | 74/331 |

Primary Examiner—Khoi Q. Ta
Attorney, Agent, or Firm—Brooks & Kushman

[57] ABSTRACT

A compound vehicular transmission having a main section and an auxiliary section which includes an auxiliary countershaft gear assembly having an auxiliary countershaft, a first auxiliary countershaft gear fixed to the auxiliary countershaft and constantly meshed with an output shaft range gear, and a second auxiliary countershaft gear selectively coupleable to the auxiliary countershaft and constantly meshed with an intermediate shaft output gear. A jaw clutch is provided for coupling either the auxiliary countershaft to the main countershaft, or the auxiliary countershaft to the second auxiliary countershaft gear. This allows fewer gears to be utilized to achieve a desired number of speed ratios. Since the auxiliary countershaft drive gears are clutched only when used, this arrangement reduces spin back speed of the intermediate shaft to accommodate smoother and faster shifting of the transmission. Alternative embodiments include the use of a two-speed master clutch splitter section or a two-position synchronizing clutch assembly as the input to the main transmission section.

13 Claims, 9 Drawing Sheets

| GEAR | CLUTCHES ENGAGED | RANGE | RATIO |
|---|---|---|---|
| 14 | S1, J1 | H | 0.78 |
| 13 | S2, J1 | H | 1.00 |
| 12 | S1, J2 | H | 1.28 |
| 11 | S2, J2 | H | 1.64 |
| 10 | S1, J3 | H | 2.09 |
| 9 | S2, J3 | H | 2.68 |
| 8 | S1, J4 | L | 3.43 |
| 7 | S2, J4 | L | 4.39 |
| 6 | S1, J1, J5 | L | 5.62 |
| 5 | S2, J1, J5 | L | 7.20 |
| 4 | S1, J2, J5 | L | 9.20 |
| 3 | S2, J2, J5 | L | 11.80 |
| 2 | S1, J3, J5 | L | 15.05 |
| 1 | S2, J3, J5 | L | 19.30 |
| R2 | S1, JR, J5 | L | -15.05 |
| R1 | S2, JR, J5 | L | -19.30 |
| R3 | S1, JR | H | -2.09 |
| R4 | S2, JR | H | -2.68 |

| GEAR | CLUTCHES ENGAGED | RANGE | RATIO |
|---|---|---|---|
| 16 | S2, J4 | H | 0.68 |
| 15 | S1, J4 | H | 0.83 |
| 14 | S2, J1 | H | 1.00 |
| 13 | S1, J1 | H | 1.21 |
| 12 | S2, J2 | H | 1.46 |
| 11 | S1, J2 | H | 1.77 |
| 10 | S2, J3 | H | 2.14 |
| 9 | S1, J3 | H | 2.59 |
| 8 | S2, J4 | L | 3.13 |
| 7 | S1, J4 | L | 3.78 |
| 6 | S1, J1 | L | 4.57 |
| 5 | S1, J1 | L | 5.53 |
| 4 | S2, J2 | L | 6.69 |
| 3 | S1, J2 | L | 8.07 |
| 2 | S2, J3 | L | 9.78 |
| 1 | S1, J3 | L | 11.83 |
| R2 | S2, JR | L | -9.77 |
| R1 | S1, JR | L | -11.83 |
| R4 | S2, JR | H | -4.57 |
| R3 | S1, JR | H | -5.53 |

COMPOUND VEHICULAR TRANSMISSION

CROSS REFERENCE TO RELATED APPLICATION

This application is a continuation-in-part of currently pending U.S. patent application Ser. No. 08/086,149 titled "Auxiliary Transmission Section", filed Jul. 1, 1993, now U.S. Pat. No. 5,386,066 and assigned to the assignee of the present invention.

TECHNICAL FIELD

The present invention relates to a compound change gear transmission having an improved auxiliary section including an auxiliary countershaft gear assembly having clutched auxiliary countershaft drive gears. The transmission also includes a synchronized input splitter or a two-speed master clutch input splitter.

BACKGROUND ART

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main section ratios and the auxiliary section ratios. By way of example, at least in theory, a compound change gear transmission including a four (4) speed main section connected in series with a three (3) speed auxiliary section will provide twelve available gear ratios (4×3=12).

Auxiliary transmission sections are of three general types: range type, splitter type or combined range and splitter type.

In compound transmissions having a range type auxiliary section, the ratio step or steps may be greater than, equal to, or less than the total ratio coverage of the main transmission section. The main section is then shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference in their entirety.

In compound transmissions having a splitter type auxiliary section, the ratio steps of the splitter auxiliary section are less than the ratio steps of the main transmission section. In these transmissions each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference in their entirety.

In a combined range and splitter type auxiliary section, or sections, both range and splitter type ratios are provided. This allows the main section to be progressively shifted through available ratios divided into at least two ranges while also allowing the main section ratios to be split in at least one of the ranges.

Examples of a compound transmission having a single combined range/splitter type auxiliary section may be seen by reference to U.S. Pat. Nos. 3,283,613; 3,648,546, the disclosures of which are hereby incorporated by reference in their entirety. A single combined range/splitter type auxiliary section may also be seen by reference to publication Small Scale Print No. 016-AD; Fuller Transmissions; Models RT-14613, RTO-14613, RTOO-14613, published March 1981 by Eaton Corporation, assignee of the present invention, the disclosure of which is hereby incorporated by reference in its entirety. Another example is the "Ecosplit" model of transmission sold by Zahnradfabrik Friedrichshafen Aktiengeseushaft of Friedrichshafen, Federal Republic of Germany, which utilizes a separate splitter auxiliary section located in front of the main transmission section and a separate range auxiliary section located behind the main transmission section.

It should be noted that the terms main and auxiliary sections are relative. Thus, if the designations for the main and auxiliary sections are reversed, the type of auxiliary section (either range or splitter) will also be reversed. In other words, given what is conventionally considered a four-speed main section with a two-speed range type auxiliary section, if the normally designated auxiliary section is considered the main section, the normally designated main section would be considered a four-speed splitter type auxiliary section. By generally accepted transmission industry convention, and as used in describing the present invention, the main transmission section of a compound transmission is that section which contains the greater number (or equal number) of forward speed ratios, which allows selection of a neutral position, which contains the reverse ratio(s) and/or which is shifted (in manual or semiautomatic transmissions) by manipulation of a shift bar, shift rail, shift shaft, or shift finger assembly. Typically the auxiliary section is shifted via a master/slave valve/cylinder arrangement, or the like.

A conventional auxiliary transmission section, such as that disclosed in U.S. Pat. No. 4,754,665, includes a mainshaft assembly and an auxiliary countershaft assembly. The mainshaft assembly typically includes an auxiliary section input shaft which cooperates with an output shaft. The auxiliary transmission section includes three gear layers, combined range and splitter gearing and four distinct selectable auxiliary section ratios.

DISCLOSURE OF THE INVENTION

An object of the present invention is to provide a compound change gear transmission which provides a desired number of gear ratios utilizing fewer gears than traditional transmissions.

Another object of the present invention is to provide a compound change gear transmission including a selectively clutchable countershaft to establish selectable torque flow paths between a main transmission section input shaft and an auxiliary transmission section output shaft.

A further object of the present invention is to provide a compound change gear transmission which includes an auxiliary transmission section having an auxiliary countershaft assembly for providing selectable inputs through the auxiliary countershaft to drive an output shaft.

Yet another object of the present invention is to provide a compound change gear transmission which includes an auxiliary transmission section having selectively clutchable drive gears for driving an auxiliary countershaft so as to reduce spin back speed of a mainshaft.

Still another object of the present invention is to provide a compound change gear transmission having a synchronized splitter to bring an auxiliary section countershaft into synchronous speed with a main section countershaft.

Another object of the present invention is to provide a compound change gear transmission having a two-speed master clutch splitter to bring an auxiliary section countershaft into synchronous speed with a main section countershaft.

In carrying out the above objects and other objects and features of the present invention, a compound change gear transmission includes an intermediate shaft disposed between transmission input and output shafts with main countershafts and auxiliary countershafts disposed parallel thereto. A torque input splitter gear is coaxial with and rotatable relative to the input shaft. A second splitter gear coaxial with the input and intermediate shafts is mounted for rotational engagement with the input and intermediate shafts. A plurality of intermediate shaft drive gears are mounted rotatably on the intermediate shaft and a plurality of main countershaft gears are fixed for rotation with the main countershaft. The splitter gear and intermediate shaft drive gears are selectively clutchable and in continuous meshing engagement with the main countershaft gears. An intermediate shaft output gear is fixed for rotation with the intermediate shaft and an output shaft range gear is coaxial with and rotatable relative to the output shaft.

A two-way synchronizer coupling is fixed for rotation with the output shaft and operable for coupling the intermediate shaft output gear and also for coupling the output shaft splitter gear to the output shaft. The transmission also includes an auxiliary countershaft assembly comprising an auxiliary countershaft, a first auxiliary countershaft gear fixed for rotation on the auxiliary countershaft and constantly meshed with the output shaft splitter gear, and a second auxiliary countershaft gear selectively engageable with the auxiliary countershaft and constantly meshed with the intermediate shaft output gear. A clutch assembly fixed for rotation on the auxiliary countershaft has a position for selectively coupling the auxiliary countershaft to the main countershaft.

The advantages accruing to the present invention are numerous. For example, a two-speed master clutch input splitter provides smoother starting and enables a power shift every other shift. Furthermore, the two-speed master clutch (e.g. a hydraulic wet clutch) provides protection from damaging operation due to a dry sump, since loss of lube pump and oil lube pressure disengages the clutch. Another advantage of the present invention is the reduced size and weight of the transmission which results from the reduction in the number of gears necessary to achieve a desired number of available gear ratios. A reduced number of gears also allows a shorter, lighter transmission case which further reduces the weight of the transmission.

The above objects and other objects, features, and advantages of the present invention will be readily appreciated by one of ordinary skill in this art from the following detailed description of the best mode for carrying out the invention when taken in connection with the accompanying drawings.

BRIEF DESCRIPTION OF THE DRAWINGS

FIG. 2b is a torque flow diagram illustrating the plurality of torque flow paths through the compound transmission of FIG. 2a;

FIG. 3a is a schematic illustration of the shift pattern for the transmission of FIG. 2a;

FIG. 2b illustrates which gear clutches of FIG. 2a, are engaged for each position of the shift pattern of FIG. 3a;

FIG. 4b is a torque flow diagram illustrating the plurality of torque flow paths through the compound transmission of FIG. 4a;

FIG. 5a is a schematic illustration of the shift pattern for the transmission of FIG. 4a;

FIG. 5b illustrates which of the gear clutches of FIG. 4a are engaged for each position of the shift pattern of FIG. 5a;

FIG. 6b is a torque flow diagram illustrating the plurality of torque flow paths through the compound transmission of FIG. 6a;

FIG. 7a is a schematic illustration of the shift pattern for the transmission of FIG. 6a;

FIG. 7b illustrates which of the gear clutches of FIG. 6a are engaged for each position of the shift pattern of FIG. 7a;

FIG. 8b is a torque flow diagram illustrating the plurality of torque flow paths through the compound transmission of FIG. 8a;

FIG. 9a is a schematic illustration of the shift pattern for the transmission of FIG. 8a; and FIG. 9b illustrates which of the gear clutches of FIG. 8a are engaged for each position of the shift pattern of FIG. 9a.

BEST MODE FOR CARRYING OUT THE INVENTION

The following terminology will be used in the description of the present invention for convenience only and thus, will not be limiting. The words "upwardly", "downwardly", "rightwardly", and "leftwardly" will designate directions in the drawings to which reference is made. The words "forward" and "rearward" will refer respectively to the front and rear ends of a transmission as conventionally mounted in a vehicle, corresponding respectively to the left and right sides of the prior art main transmission section illustrated in FIG. 1.

The term "compound transmission" is used to designate a change speed or change gear transmission having a main transmission section and an auxiliary transmission section connected in series whereby the selected gear reduction (or multiplication) in the main transmission section may be compounded by further selected gear reduction (or multiplication) in the auxiliary transmission section. The term "upshift" as used herein shall mean the speed gear ratio is changed from a lower value to a higher value. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e. a set of gears having a higher ratio of reduction of output shaft speed relative to the speed of the input shaft. "Synchronizing clutch assembly" and words of similar import shall designate a clutch assembly utilized to non-rotatably couple a selected gear to a shaft by means of a positive clutch. Attempted engagement of the positive clutch is prevented until the members of the clutch are at substantially similar rotation speeds. The synchronized clutch assembly includes relatively large capacity friction means associated with the clutch members which are sufficient, upon initiation of a clutch engagement, to cause the clutch members and all members rotating therewith to rotate at a substantially synchronous speed.

Figure 1:
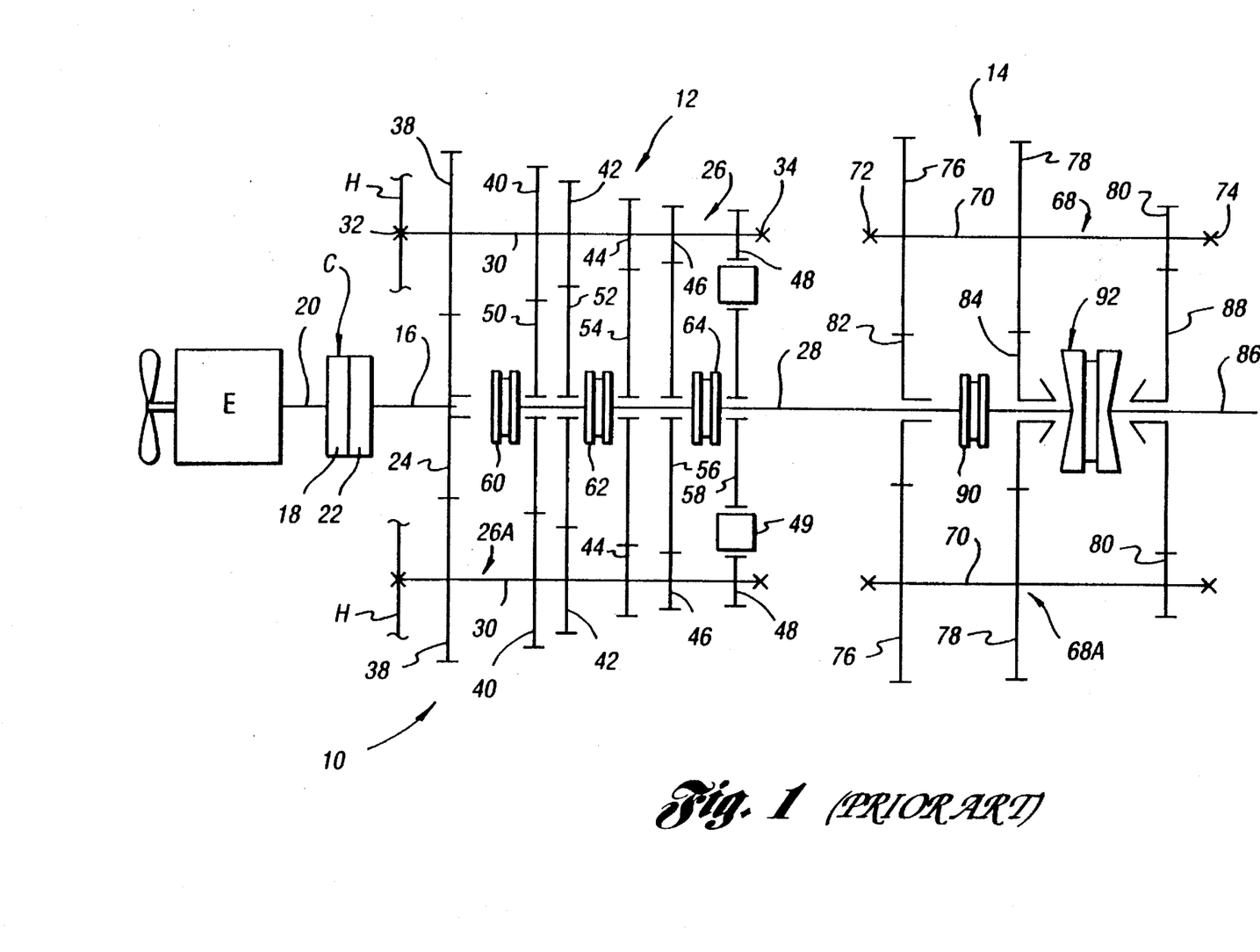
FIG. 1 is a schematic illustration of a prior art compound transmission section having a multi-speed main transmission section connected in series with an auxiliary transmission section.

FIG. 1 schematically illustrates a well known, commercially successful compound transmission, indicated generally by reference numeral 10, having eighteen forward speeds. Transmission 10 includes a main transmission section, indicated generally by reference numeral 12, connected in series with an auxiliary transmission section, indicated generally by reference numeral 14. Typically, transmission 10 is housed in a single housing and includes an input shaft 16 driven by an engine E through a selectively disengaged, normally engaged master friction clutch C. Master friction clutch C includes an input or driving section 18 connected to the engine crankshaft 20, and a driven portion 22 rotatably fixed to a transmission input shaft 16.

With continuing reference to FIG. 1, within main transmission section 12, input shaft 16 carries an input gear 24 for simultaneously driving a plurality of substantially identical main section countershaft assemblies 26 and 26A at substantially identical rotational speeds. In the transmission illustrated, two (2) substantially identical main section countershaft assemblies are provided on diametrically opposite sides of a mainshaft 28 which is generally coaxially aligned with input shaft 16. Each of the main section countershaft assemblies 26 and 26A includes a main section countershaft 30 supported by bearings 32 and 34 in housing H, only a portion of which is schematically illustrated.

Each of the main section countershafts 30 is provided with an identical grouping of main section countershaft gears 38, 40, 42, 44, 46 and 48, fixed for rotation therewith. A plurality of main section drive gears (mainshaft gears) 50, 52, 54, 56 and 58 surround mainshaft 28 and are selectively clutchable, one at a time, to mainshaft 28 for rotation therewith via sliding jaw clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles mainshaft 28 and is in continuous meshing engagement with, and floatingly supported by an associated countershaft gear group.

Typically, sliding jaw clutch collars 60, 62 and 64 are axially positioned by means of shift forks (not illustrated) associated with a shift bar housing assembly (not illustrated) as is well known in the art. Sliding jaw clutch collars 60, 62 and 64 are of the well known non-synchronized double acting jaw clutch type. Sliding jaw clutches collars 60, 62 and 64 define three-position clutches which may be positioned in a centered, non-engaged position as illustrated, in a fully rightwardly engaged position, or in a fully leftwardly engaged position.

With continuing reference to FIG. 1, main section mainshaft gear 58 functions as a reverse gear which is in continuous meshing engagement with countershaft gears 48 by means of conventional intermediate idler gears 49. It should also be noted that while main transmission section 12 provides five selectable forward speed ratios, the lowest forward speed ratio is often of such a high gear reduction as to be considered a low or "creeper" gear which is utilized only for starting of a vehicle under severe conditions. A creeper gear transmits torque through main transmission section 12 when drive gear 56 is drivingly coupled to mainshaft 28 by sliding jaw clutch 64. The creeper gear is usually not utilized in the higher transmission range and/or is not typically split in the lower transmission range.

Auxiliary transmission section 14 includes two substantially identical auxiliary countershaft assemblies 68 and 68A, each having an auxiliary countershaft 70 supported by bearings 72 and 74 mounted in housing H. Each auxiliary countershaft 70 supports three auxiliary section countershaft gears 76, 78 and 80 fixed for rotation therewith. Auxiliary countershaft gears 76 are constantly in mesh with auxiliary section splitter gear 82 which is selectively coupled to mainshaft 28 via sliding jaw clutch collar 90.

As also illustrated in FIG. 1, auxiliary countershaft gears 78 are constantly in mesh with, and support, auxiliary section splitter/range gear 84 which is selectively coupled to output shaft 86 via synchronizing clutch assembly 92. Output shaft 86 is coaxial with mainshaft 28. Auxiliary section countershaft gears 80 are constantly in mesh with, and support, auxiliary section range gear 88 which is selectively engageable with output shaft 86 via two position synchronizing clutch assembly 92. Accordingly, auxiliary section countershaft gears 76 and splitter gear 82 define a first gear layer. Similarly, auxiliary section countershaft gears 78 and splitter/range gear 84 define a second gear layer, while auxiliary section countershaft gears 80 and range gear 88 define a third gear layer. Thus, the illustrated combined splitter and range type auxiliary transmission section 14 includes three (3) gear layers or groups.

Sliding two position jaw clutch collar 90 is utilized to selectively couple either splitter gear 82, or splitter/range gear 84, to mainshaft 28. Similarly, two position synchronizing clutch assembly 92 is utilized to selectively couple splitter/range gear 84, or range gear 88, to output shaft 86.

Referring now to FIGS. 2a, 4a, 6a and 8a, each figure schematically illustrates a compound transmission 10A, 10B, 10C, and 10D, respectively including an auxiliary transmission section 14A, 14B, 14C and 14D, respectively, constructed in accordance with the present invention. Compound transmissions 10A–10D comprise main transmission sections 12A, 12B, 12C and, 12D, respectively, which are similar in construction and operation to main transmission section 12 described above in reference to prior art transmission 10.

Transmission sections 12A–12D each have a different number of intermediate mainshaft gears and corresponding countershaft gears as hereinafter described and illustrated in the drawings. In main transmission sections 12A–12D, the main countershafts are selectively engageable to the auxiliary section countershafts for driving auxiliary transmission sections 14A–14D and reducing the number of gears required for a desired number of speed ratios as described below. Immediately following, and by way of example, is a detailed description of the transmission of FIG. 2a. The description can easily be applied to the transmissions illustrated in FIGS. 4a, 6a and 8a since primed reference numerals (xx', xx") correspond in position and function to the unprimed reference numerals of FIG. 2a.

Figure 2A:
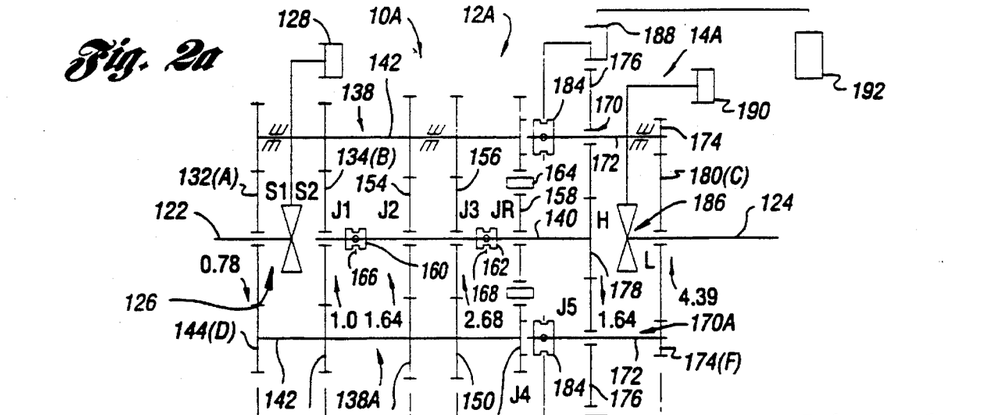
FIG. 2a is a schematic illustration of a first embodiment of a compound transmission having fourteen forward speeds including an auxiliary countershaft assembly constructed in accordance with the present invention.

With continuing reference to FIG. 2a, multiple ratio transmission 10A is a fourteen forward speed, four-reverse speed, compound manually operated transmission wherein a main transmission section 12A is connected in series to an auxiliary transmission section 14A. The main transmission section 12A includes a two-speed input splitter section; whereas, auxiliary section 14A includes a four speed splitter/range section. Typically, transmission 10A is housed within a single housing (not shown) and includes an input shaft 122 driven by an engine (not shown), such as a diesel engine or the like.

Figure 4A:
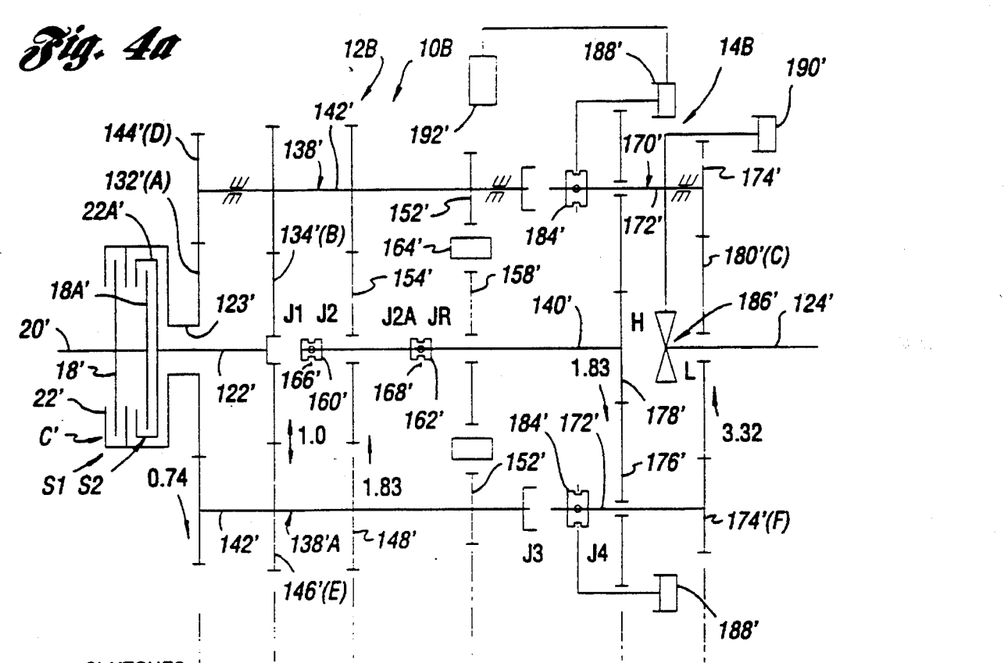
FIG. 4a is a schematic illustration of a second embodiment of a compound transmission having ten forward speeds including a two-speed master clutch splitter constructed in accordance with the present invention.

Within main transmission section 12A, input shaft 122 drives a synchronizing clutch assembly 126. Synchronizing clutch assembly 126 is actuated by an actuator 128 such as a three-position piston, or the like, and has a first position (corresponding to engagement of synchronizer S1) for engaging a first (torque) input splitter gear 132 to input shaft 122, a second position (corresponding to engagement of synchronizer S2) for engaging a second input splitter gear 134 to input shaft 122, and a third position (as illustrated) wherein first and second splitter gears 132, 134 are drivingly disconnected from input shaft 122. The input splitter section thus defines a first synchronizer S1 and second synchronizer S2 which are mutually exclusively engageable to couple first input splitter gear 132 or second input splitter gear 134 to input shaft 122. Alternatively, a two-speed master clutch splitter may be utilized as illustrated in FIG. 4a and described in greater detail below.

With continuing reference to FIG. 2a, torque input splitter gear 132 and second input splitter gear 134 simultaneously drive a pair of substantially similar main section countershaft assemblies 138 and 138A at substantially similar rotation speeds. In the transmission illustrated, main section countershaft assemblies 138, 138A are located on diametrically opposite sides of an intermediate shaft 140 which is generally coaxially aligned with input shaft 122 and output shaft 124. Each of the main section countershaft assemblies 138, 138A includes a main section countershaft 142 supported by bearings (not shown). A substantially similar grouping of main section countershaft gears 144, 146, 148, 150, and 152 are coupled to each main section countershaft 142 for rotation therewith.

As also illustrated in FIG. 2a, main section drive gears 154, 156, and 158 surround intermediate shaft 140 and are selectively clutchable, one at a time, to intermediate shaft 140 for rotation therewith by sliding jaw clutches 160 and 162 as is well known in the prior art. Sliding jaw clutch 160 may also be utilized to couple second splitter gear 134 directly to intermediate shaft 140 to provide a direct driving relationship therebetween. Of course, with synchronizer S2 engaged, second splitter gear 134 will rotate with input shaft 122 and drive main section countershaft gears 146. With synchronizer S1 engaged, first splitter gear 132 will rotate with input shaft 122 and drive main section countershaft gears 144.

Main section drive gears 154, 156 are in continuous meshing engagement with, and floatingly supported by, the associated main section countershaft gears 148, 150, respectively. Main section intermediate shaft gear 158 is the reverse gear which is in continuous meshing engagement with main section countershaft gear 152 by means of conventional intermediate idler gears 164.

Main section sliding jaw clutch collars 160 and 162 are axially positioned by shift forks 166 and 168, respectively, and are typically manually controlled by means of a shift lever or the like, as is well known from the prior art. Sliding jaw clutch collars 160 and 162 are of the well known nonsynchronizing type of double acting jaw clutch.

The manually controlled main section 12A defines six clutches (including two synchronizing clutch assemblies) S1, S2, J1, J2, J3 and JR. The synchronizers S1, S2 are mutually exclusively engageable to drivingly couple either of the two input splitter gears 132, 134 to input shaft 122. Clutches J1, J2, J3, and JR are mutually exclusively engageable to drivingly couple intermediate shaft 140 to input splitter gear 134, main section drive gears 154, 156, or reverse drive gear 158, respectively.

The combined splitter/range auxiliary section 14A includes two substantially similar auxiliary countershaft assemblies 170 and 170A. Each countershaft assembly 170, 170A includes an auxiliary countershaft 172 which is supported by bearings within a housing (not shown). Each auxiliary countershaft 172 supports two auxiliary section countershaft gears 174, 176. Auxiliary section countershaft gears 174 are coupled to an auxiliary countershaft 172 for rotation therewith. Auxiliary section countershaft gears 176 are selectively engageable to auxiliary countershaft 172 and are in continuous meshing engagement with intermediate shaft output gear 178 so as to provide support thereto. Similarly, auxiliary countershaft gears 174 are constantly in mesh with auxiliary section range gear 180 and provide support thereto. Auxiliary section range gear 180 is selectively engageable to an output shaft 124 via two position synchronizing clutch assembly 186.

With continuing reference to FIG. 2a, a sliding jaw clutch collar 184 is positioned by an actuator 188, such as a two-position piston or the like. Control means 192 is responsive to gear shift position and controls actuator 188 accordingly to engage clutch J4, clutch J5, or maintain an intermediate position as illustrated. Clutch J4 is utilized to selectively couple main section countershafts 142 to auxiliary section countershafts 172; whereas, clutch J5 is utilized to selectively couple auxiliary section drive gears 176 to auxiliary section countershafts 172. By providing clutchable auxiliary section drive gears 176, intermediate shaft 140 is decoupled from output shaft 124 for those gear ratios where the torque flow path includes main countershaft 142 and auxiliary countershaft 172, such as gears 7 and 8. Thus, intermediate shaft 140 and its associated components are not drivingly rotated unnecessarily when they are not being utilized to transmit torque through transmission 10A. The resulting reduction in spin back speed of intermediate shaft 140 facilitates smoother, faster shifts.

As also illustrated in FIG. 2a, a two position synchronizing clutch assembly 186 is utilized to selectively couple a range gear 180 to output shaft 124. Synchronizing clutch assembly 186 defines two mutually exclusive engageable range torque flow paths H and L which are operative to couple gears 178 and 180, respectively, to output shaft 124. For example, in high range H, synchronizing clutch assembly 186 couples intermediate shaft output gear 178 to output shaft 124. In low range L, synchronizing clutch assembly 186 couples range gear 180 to output shaft 124. Thus, in low range L, torque is transmitted to auxiliary countershafts 172 either through intermediate shaft 140, intermediate shaft output gear 178 and auxiliary drive gears 176 (via engaged clutch J5); or through main countershafts 142 and main countershaft drive gears 152 (via engaged clutch J4). Actuator 190 is a two position fluid actuated piston for effecting selection of the desired torque flow path, H or L, via two position synchronizing clutch assembly 186.

Figure 2B:
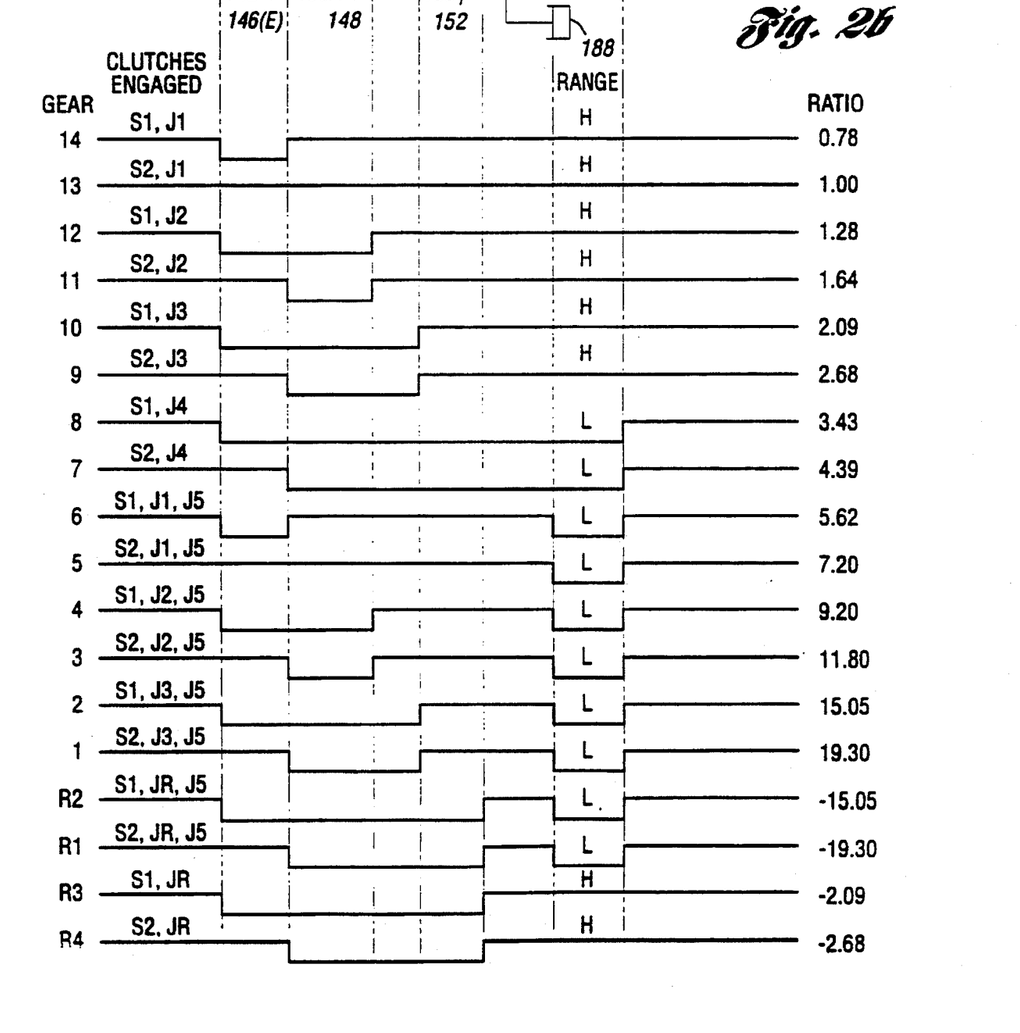

FIG. 2b is a torque flow diagram illustrating the plurality of torque flow paths through the compound transmission of FIG. 2a. Torque is transmitted either along a first axis which is coaxial with input shaft 122, intermediate shaft 140, and output shaft 124, or along a pair of second axes which are coaxial with main section countershafts 142 and auxiliary section countershafts 172. A downward step in the torque flow diagram indicates that torque flow has been transferred from components coaxial with the first axis to components coaxial with the second axes. Similarly, an upward step in the torque flow diagram indicates that torque flow has been transferred from components coaxial with the second axes to components coaxial with the first axis.

For example, when gear three is selected, synchronizer S2, and clutches J2 and J5 are engaged. Torque is transferred along input shaft 122 (coaxial with the first axis) through clutch S2 and through gears 134, 146 (in constant meshing engagement) to main section countershafts 142 (coaxial with the second axes). Torque then flows through gears 148 to gear 154 and clutch J2 to intermediate shaft 140 (again coaxial with the first axis). Torque is then transferred through gear 178 to gears 176 and to auxiliary countershafts 172 (again coaxial with the second axes) via clutch J5. Finally, torque is transferred through gears 174 to gear 180 and then to output shaft 124 via synchronizing clutch assembly 186 (again coaxial with the first axis). This results in a gear ratio (input shaft speed divided by output shaft speed) of 11.80.

The speed ratios represented on the torque flow paths for each of forward and reverse speeds are illustrative and provide only one example of implementation. In this particular implementation, assumptions were made to provide equal steps between speed ratios in the main transmission section between the second splitter gear and auxiliary countershaft input. This provides a lowest overall transmission speed ratio of about 20:1 and a highest overall transmission speed ratio of about 0.8:1. Given these assumptions, the ratios as illustrated in FIG. 2b are obtainable. The torque flow paths for the remaining gears, as well as the torque flow paths illustrated in FIGS. 4a, 6a, and 8a, may be interpreted in an analogous manner.

Within main transmission section 12A of FIG. 2a, the number of teeth on torque input splitter gear 132 is represented by parenthetical reference letter A. Similarly, the number of teeth on second splitter gear 134 is represented by parenthetical reference letter B. Likewise, the number of teeth on each of main section countershaft gears 144 is represented by parenthetical reference letter D and the number of teeth on each of main section countershaft gears 146 is represented by parenthetical reference letter E. Within auxiliary section 14A, the number of teeth on range gear 180 is represented by parenthetical reference letter C and the number of teeth on auxiliary countershaft gears 174 is represented by parenthetical reference letter F.

With continuing reference to FIG. 2a, various gear ratios between meshing gears are illustrated with a decimal numeral followed by an arrow indicating the direction of torque flow corresponding to that gearing ratio. The gearing ratio is determined by dividing the number of teeth on the driven gear by the number of teeth on the driving gear. If the torque flows in the direction opposite that indicated by the arrow, the gearing ratio is the reciprocal of that shown. For example, when synchronizing clutch assembly S1 is engaged, torque flows from input shaft 122 to input splitter gear 132 and to main countershaft gear 144. Since this corresponds to the direction of the arrow indicating a gear ratio of 0.78, that gear ratio represents the number of teeth D on the driven gear 144 divided by the number of teeth A on the driving gear 132.

Compound transmissions may be designed to have variable ratio steps or approximately equal ratio steps. Compound transmissions having equal ratio steps, such as those implementations of the present invention illustrated in FIGS. 2a–8a, may be referred to by the average ratio step. For example, a 28% transmission would have ratio steps of 28%, i.e. any gear N divided by the next higher (numerically) gear N+1 is approximately equal to 1.28. The ratio steps are only approximately equal due to constraints in designing and manufacturing gears with the appropriate number of teeth to be used in various combinations to establish exactly equal ratio steps. Thus, the ratio steps are within about 10% of the ideal design value, i.e. ratio steps between about 25% and 31% are obtainable using standard gear tooling.

For compound transmissions having input gearing ratios less than unity (overdrive input ratios), such as those illustrated in FIGS. 2a (0.78) and 4a (0.74), the average transmission ratio step is generally indicated by the product of the ratios defined by A/D and E/B. For the compound transmission of FIG. 2a, the average ratio step (1.28) is equal to A/D (1.28) multiplied by E/B (1.00). The product of the ratios defined by C/F and E/B is then generally equal to the average transmission ratio step (A/D.E/B) raised to the 2N power, where N is equal to the total number of forward speed ratios available on the intermediate shaft. For example, for the 28% transmission illustrated in FIG. 2a, A/D≈1.28, E/B≈1.00, and C/F≈4.39. There are three (3) forward speed ratios available on the intermediate shaft 140 (N=3), so (E/B .C/F)≈$(1.28)^{2.3}$, or 4.44.

Figure 3A:
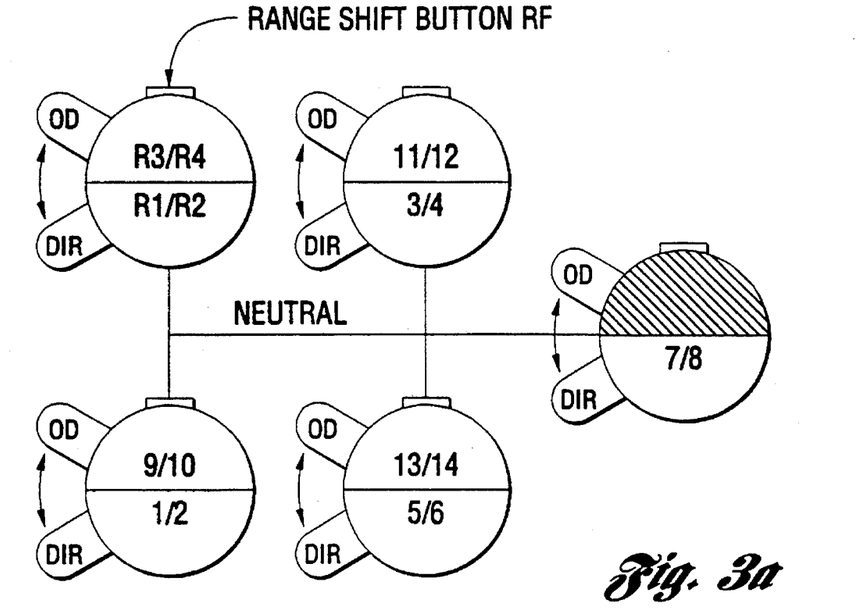

As illustrated in FIGS. 2a and 2b, the multiple ratio transmission 10A provides fourteen forward speeds utilizing 23 gears. Prior art transmissions have required 29 gears to achieve fourteen speeds since those transmissions do not couple a main countershaft to an auxiliary countershaft. The shift pattern for shifting fourteen forward speed transmission 10A of the present invention is illustrated in FIG. 3a. Locations of the shift lever depicted in FIG. 3a correspond to engagement of the clutches indicated in FIG. 3b.

Referring now to FIG. 3a, a first master control having two selectable positions, defined by a two position lever (labeled DIR and OD), splits shifts for each position of the shift pattern. A second master control having two selectable positions allows operator selection of either one of the two range ratios. The range is selected by a two position button RF. Range shifting associated with each position of the shift pattern is illustrated with high range indicated by the upper half of the circle, and low range being indicated by the lower half of the circle. For example, to select gear nine, the shift lever is placed in the lower left position of the shift pattern, the range shift button RF is raised to select high range, and the splitter button is in the DIR position. To shift the transmission from gear nine to gear ten, the splitter button is moved from the DIR position to the OD position.

Figure 3B:
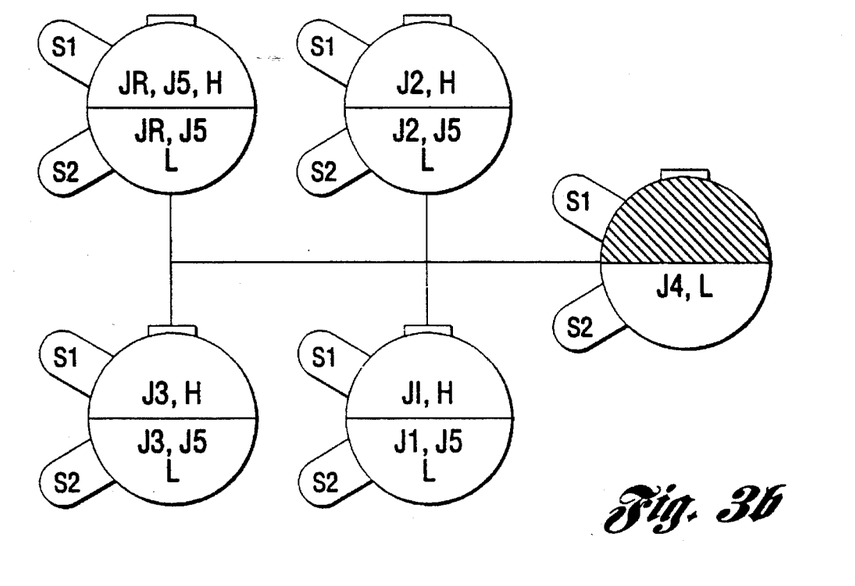

FIG. 3b illustrates the engaged clutches of FIG. 2a for each combination of the shift lever, range button RF, and splitter lever illustrated in FIG. 3a. For example, when gear six is selected, the shift lever is in the lower right position of the shift pattern, the range button RF is lowered to select low range, and the splitter lever is in the OD position. As indicated by FIG. 3b, clutches S1, J1, J5, and L (synchronizing clutch assembly 186) are engaged. As illustrated in FIGS. 3a and 3b, operation of transmission 10A (FIG. 2a) from the lowest speed ratio, gear one, to the highest speed ratio, gear fourteen, requires only six (6) movements of the shift lever.

Referring now to FIG. 4a, a ten forward speed transmission having an auxiliary section constructed in accordance with the present invention illustrated. Multiple ratio transmission 10B utilizes 20 gears rather than the 23 gears typically employed in comparable prior art transmissions. The embodiment of transmission 10B illustrated in FIG. 4a differs from transmission 10A illustrated in FIG. 2a in that an optional two-speed master clutch splitter C' has replaced a master clutch (not shown) and synchronizing clutch assembly 126. An analogous construction may be utilized in transmissions 10A, 10C, and 10D illustrated in FIGS. 2a, 6a, and 8a, respectively, wherein a synchronizing clutch assembly and master clutch is replaced by a two-speed master clutch splitter.

With continuing reference to FIG. 4a, two-speed master clutch splitter C' preferably includes at least two selectable engaged positions for selection of one of two selectable input ratios. Clutch C' also has a selectable disengaged position to provide the torque break function of a traditional master clutch. Clutch C' includes a twin input or driving section 18' and 18A' connected to an engine crankshaft 20', and corresponding twin driven portions 22' and 22A' rotatably fixed to a transmission input shaft 122'. Thus, the engagement of first driving section 18' to first driven section 22' is represented by clutch S1 while the engagement of second driving section 18A' to second driven section 22A' is represented by clutch S2. A greater understanding and appreciation of the construction and operation of such a two-speed master clutch splitter may be achieved by reference to U.S. Pat. Nos. 4,831,894 and 4,966,048, the specifications of which are hereby incorporated by reference in their entirety.

As with the transmission illustrated in FIG. 2a, the parenthetical reference letters shown in FIG. 4a represent the number of teeth on the associated gear or gears. Thus, in the main transmission section 12A, the number of teeth on torque input splitter gear 132' is represented by parenthetical reference letter A, etc.

Figure 4B:
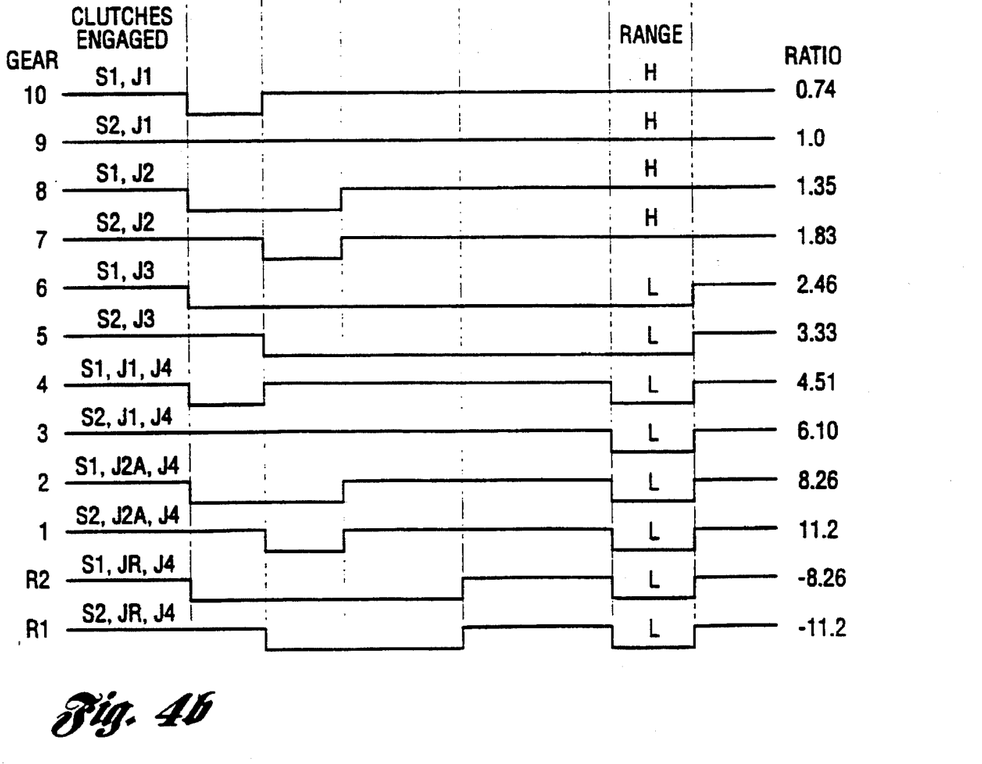

FIG. 4b illustrates the plurality of torque flow paths through the compound transmission of FIG. 4a, in addition to the engaged clutches and the approximate ratios attained for each available gear. The speed ratios represented on the torque flow paths for each of forward and reverse speeds are illustrative and provide only one example of possible implementations. In the implementation illustrated assumptions were made to provide equal steps between speed ratios in the main transmission section between the second splitter gear and auxiliary countershaft input. For this implementation, the lowest ratio would be about 11:1 and the highest ratio would be about 0.8:1. Given these assumptions, the ratios as illustrated in FIG. 4b are obtainable.

In transmission 10B, as in transmission 10A, the average transmission ratio step is generally equal to the product of the ratios determined by A/D and E/B. The product of the ratios determined by C/F and E/B is generally equal to the average transmission ratio step raised to the 2N power, where N is equal to the total number of forward speed ratios available on the intermediate shaft. For example, for the transmission illustrated in FIG. 4a, A/D≈1.35, E/B≈1.00, and C/F≈3.32. There are two (2) forward speed ratios available on the intermediate shaft 140' (N=2), so (E/B.C/F)≈$(1.35)^{2*2}$, or 3.33.

Figure 5A:
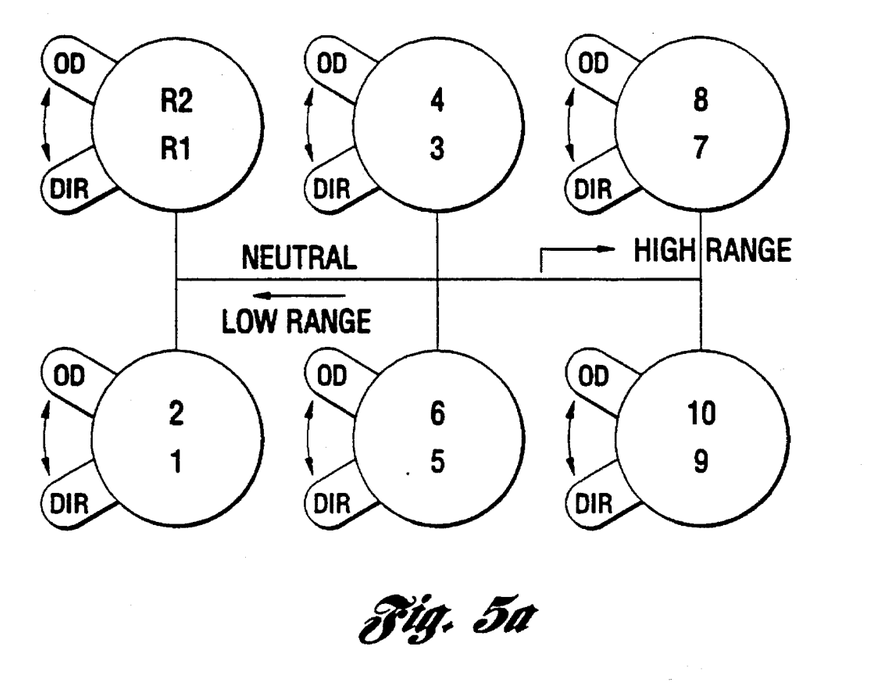

FIG. 5a illustrates the shift pattern for shifting the ten forward speed transmission of FIG. 4a. A two position splitter lever (labeled OD and DIR) on the side of the circle (representing the gear shift lever) controls splitter shifts for each position of the shift lever. A range shifting button is unnecessary since range shifting is performed automatically when the gear shift lever is moved either to or from the far right positions corresponding to gears 7/8 and 9/10. For example, moving the gear shift lever from the 5/6 position to the 7/8 position automatically shifts synchronizing clutch assembly 186' from low range to high range. Likewise, moving the gear shift lever from either the 7/8 position or the 9/10 position to any other position automatically shifts synchronizing clutch assembly 186' from high range to low range.

Figure 5B:
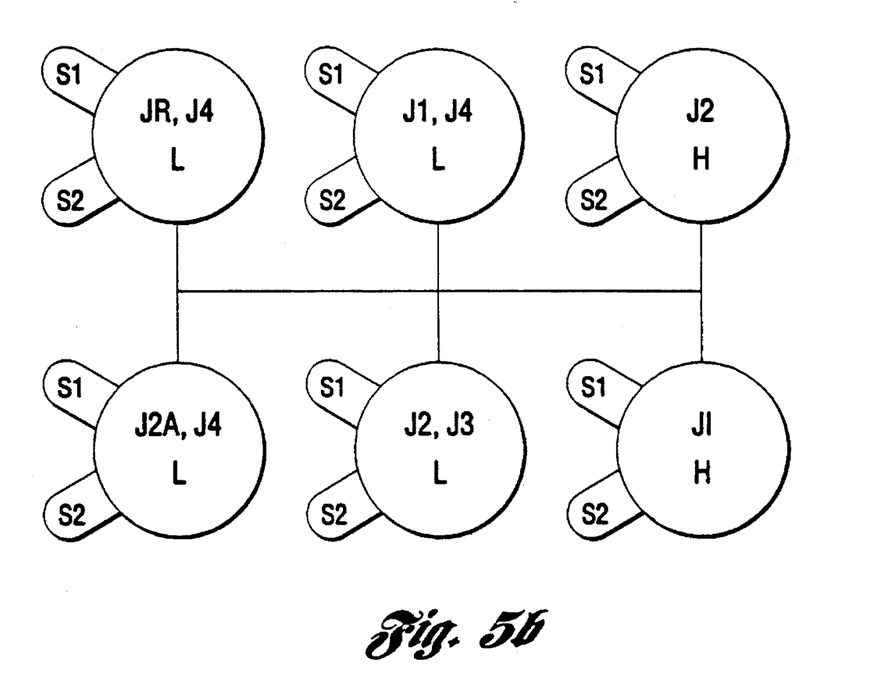

FIG. 5b illustrates the engaged clutches of FIG. 4a for each position of the shift pattern illustrated in FIG. 5a. As may be seen, operation of transmission 10B from the lowest speed ratio, gear one, to the highest speed ratio, gear ten, requires only four (4) movements of the shift lever.

Figure 6A:
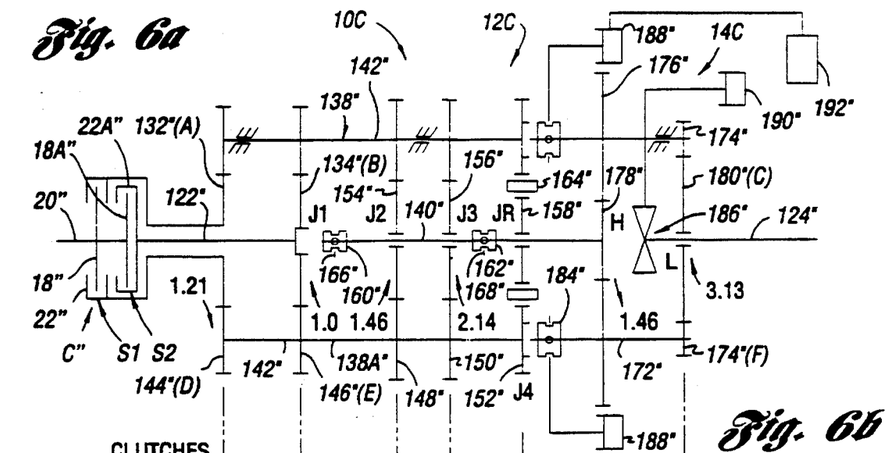
FIG. 6a is a schematic illustration of a third embodiment of a compound transmission having sixteen forward speeds constructed in accordance with the present invention.
Figure 6B:
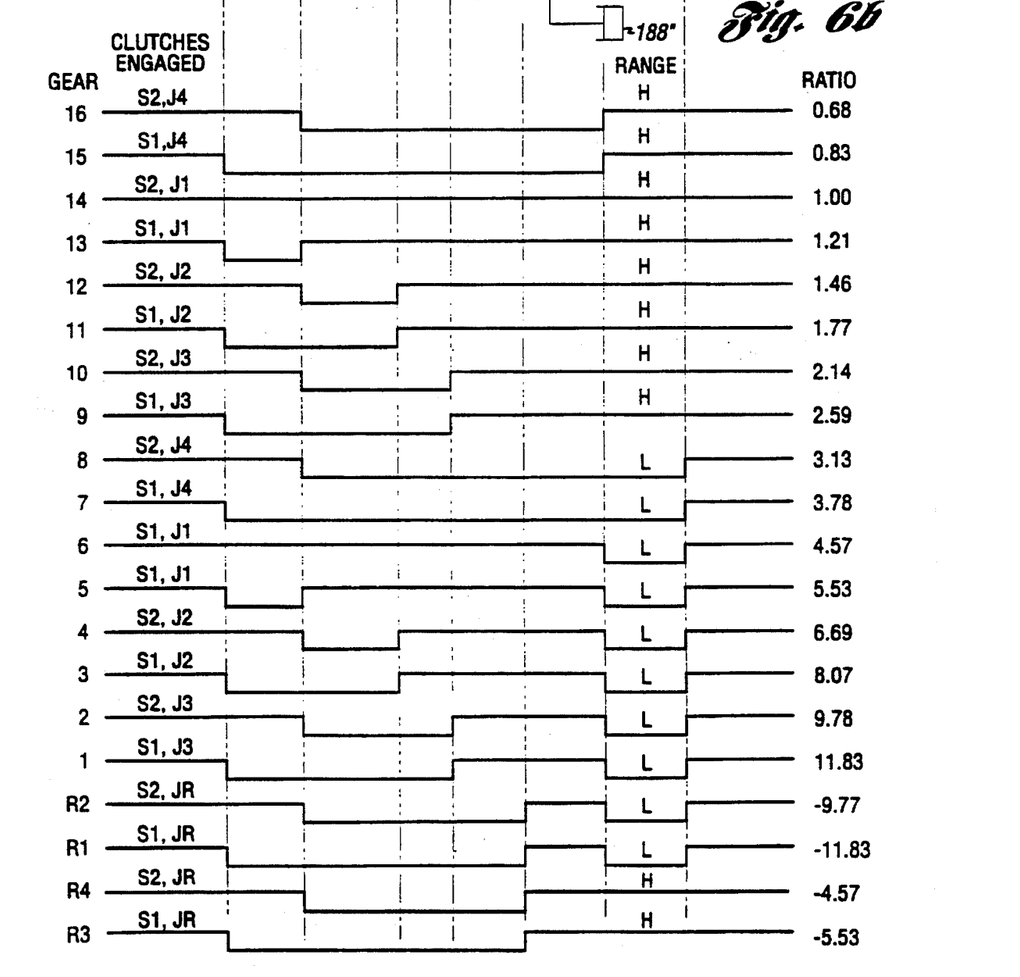

Referring now to FIG. 6a, a multiple ratio transmission 10C having sixteen forward speeds utilizing 23 gears is shown. Prior art transmissions have required 29 gears to achieve sixteen speeds since they do not couple main countershafts to auxiliary countershafts. The various torque flow paths, engaged clutches, and approximate ratios of transmission 10C are illustrated in FIG. 6b. Since this compound transmission has an underdrive input gearing ratio (1.21), the average transmission ratio step is generally indicated by the product of the ratios defined by D/A and E/B. Thus, the average ratio step (1.21) is equal to D/A (1.21) multiplied by E/B (1.00). The product of the ratios defined by C/F and E/B is then generally equal to the average transmission ratio step (D/A.E/B) raised to the 2N power, where N is equal to the total number of forward speed ratios available on the intermediate shaft. Thus, in this case, D/A≈1.21, E/B ≈1.00, and C/F≈3.13. There are three (3) forward speed ratios available on the intermediate shaft 140" (N=3), so (E/B.C/F)≈$(1.21)^{2*3}$, or 3.13.

With continuing reference to FIG. 6a, although it is possible to utilize auxiliary countershaft drive gears 176" which are selectively engageable to auxiliary countershafts 172", in this embodiment, drive gears 176" are fixed to auxiliary countershafts 172". This is possible due to the lower gear ratio (1.46) between output shaft range gear 178" and drive gears 176" as compared to the analogous gear ratios for the transmissions of FIG. 2a (1.64), FIG. 4a (1.83), and FIG. 8a (1.64). Thus, the spin back speed of intermediate shaft 140" is less significant in the transmission illustrated in FIG. 6a such that clutchable auxiliary countershaft drive gears are not required.

Figure 7A:
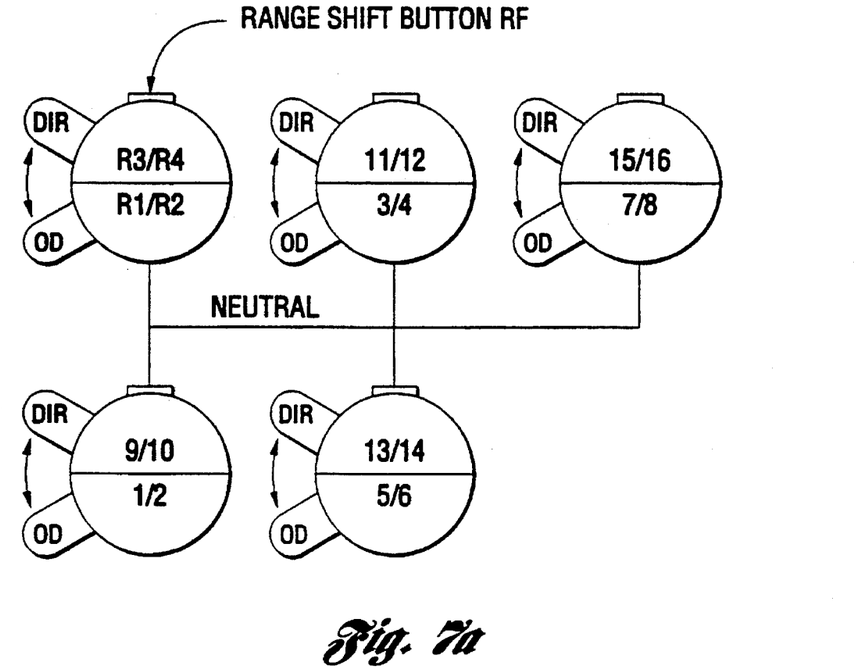
Figure 7B:
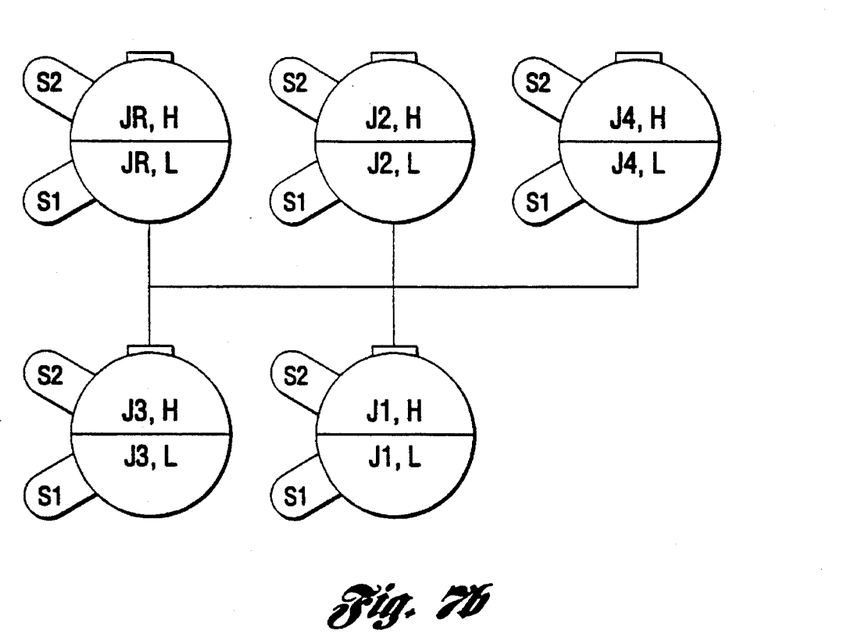

The shift pattern for shifting transmission 10C of FIG. 6a is illustrated in FIG. 7a. FIG. 7b illustrates the engaged clutches corresponding to each shift lever position illustrated in FIG. 7a. As with the transmission illustrated in FIG. 2a, a two position splitter lever (labeled DIR and OD) splits shifts for each position of the shift pattern. A two position range shift button RF is utilized to select high range (corresponding to the upper half of the circles) or low range (corresponding to the lower half of the circles).

As illustrated in FIGS. 7a and 7b, operation of transmission 10C from the lowest speed ratio, gear one, to the highest speed ratio, gear sixteen, requires only seven (7) movements of the shift lever. The speed ratios represented on the torque flow paths of FIG. 7b for each of the forward and reverse speeds are illustrative and represent only one possible implementation. In the implementation illustrated assumptions were made to provide equal steps between speed ratios in the main transmission section between the second splitter gear and auxiliary countershaft input. For this implementation, the lowest overall transmission speed ratio would be about 12:1 and the highest overall transmission speed ratio would be about 0.7:1. Given these assumptions, the ratios as illustrated in FIG. 6b are readily obtainable.

Figure 8A:
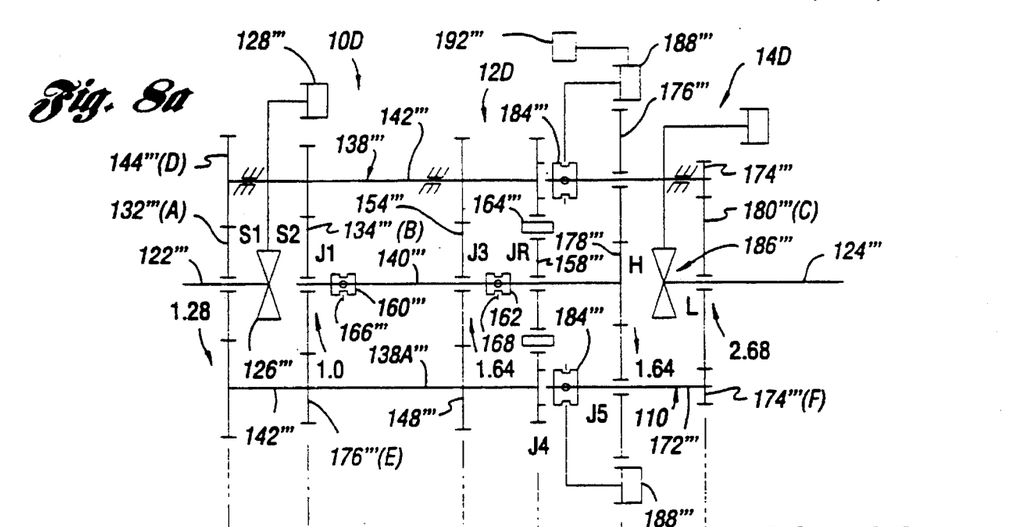
FIG. 8a is a schematic illustration of a fourth embodiment of a compound transmission having twelve forward speeds constructed in accordance with the present invention.

Referring now to FIG. 8a, a multiple ratio transmission 10D having twelve forward speeds utilizing 20 gears is illustrated. Comparable prior art transmissions required 23 gears to achieve twelve speeds without the use of coupling the main countershafts to the auxiliary countershafts. As with the transmission illustrated in FIG. 6a, this compound transmission has an underdrive input gearing ratio (1.28). Therefore, the average transmission ratio step is generally indicated by the product of the ratios defined by D/A and E/B. Thus, the average ratio step (1.28) is equal to D/A (1.28) multiplied by E/B (1.00). The product of the ratios defined by C/F and E/B is then generally equal to the average transmission ratio step (D/A.E/B) raised to the 2N power, where N is equal to the total number of forward speed ratios available on the intermediate shaft. Thus, in this case, D/A≈1.28, E/B≈1.00, and C/F≈2.68. There are two (2) forward speed ratios available on the intermediate shaft 140" (N=2), so $(E/B.C/F)=(1.28)^{2*2}$ or 2.68.

Figure 8B:
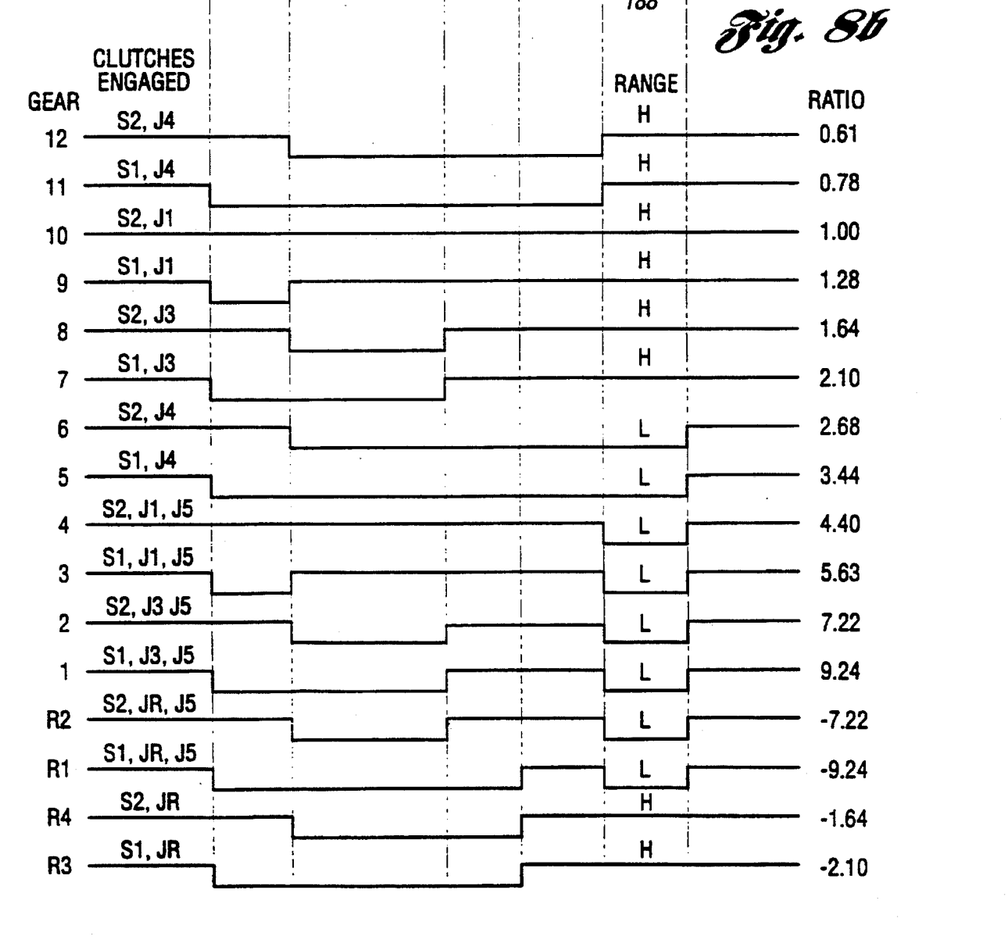
Figure 9A:
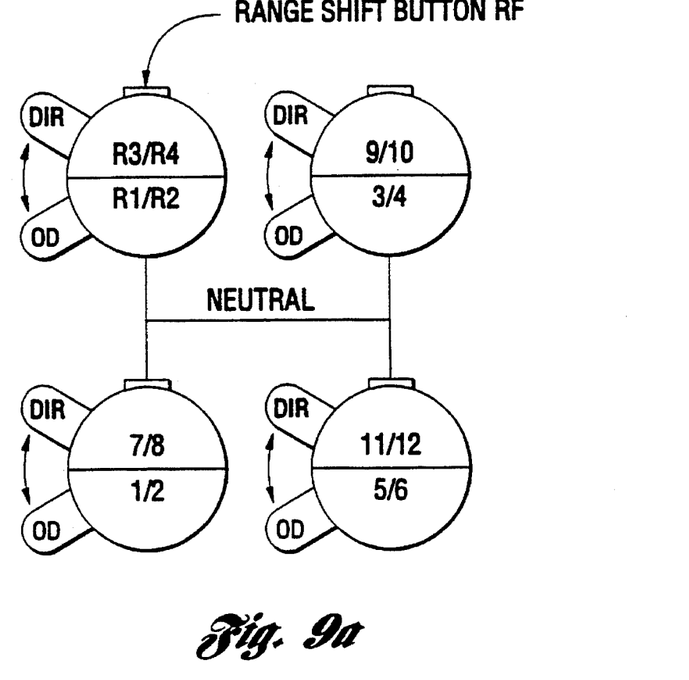
Figure 9B:
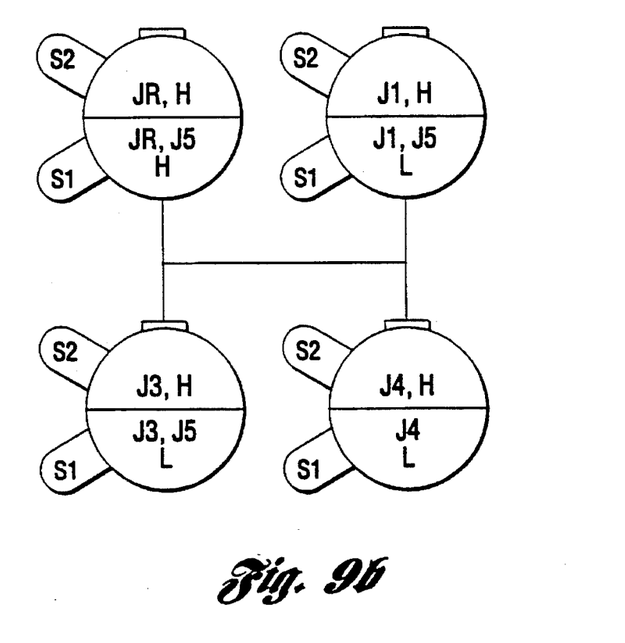

A torque flow diagram for the transmission of FIG. 8a is shown in FIG. 8b. The shift pattern for shifting the twelve forward speed transmission of FIG. 8a is illustrated in FIG. 9a with locations of the shift lever corresponding to the engagement of clutches as illustrated in FIG. 9b. Transmission 10D utilizes a splitter lever and a range shift button RF to select a desired gear. Thus, operation of transmission 10D from the lowest speed ratio (about 9:1), corresponding to gear one, to the highest speed ratio (about 0.6:1), corresponding to gear twelve, requires only five (5) movements of the shift lever.

It is understood, of course, that while the forms of the invention herein shown and described constitute the preferred embodiments of the present invention, they are not intended to illustrate all possible forms thereof. It will also be understood that the words used are descriptive rather than limiting, and that various changes may be made without departing from the spirit or scope of the invention as claimed below.

What is claimed is:

1. A compound vehicular transmission for providing a plurality of selectable speed ratios, the transmission including a main section having an input shaft selectively coupleable via a first pair of gears to a main countershaft, the main countershaft being selectively coupleable via a second pair of gears to an intermediate shaft having an output gear fixed for rotation therewith, and an auxiliary section including an auxiliary countershaft coaxially disposed relative to the main countershaft, the transmission comprising:

an auxiliary drive gear in continuous meshing engagement with the output gear, the auxiliary drive gear being selectively coupleable to the auxiliary countershaft so as to reduce spin back speed of the intermediate shaft.

2. The transmission of claim 1 wherein the auxiliary countershaft is selectively drivingly engageable to the main countershaft.

3. The transmission of claim 1 wherein the main section further includes first and second splitter gears mutually exclusively engageable to the input shaft, a plurality of intermediate shaft drive gears selectively engageable with the intermediate shaft for rotation therewith, and a plurality of main countershaft gears fixed to the main countershaft for rotation therewith, each of the plurality of main countershaft gears being in continuous meshing engagement with a corresponding one of the first and second splitter gears and the plurality of intermediate shaft drive gears, the transmission further comprising:

at least one auxiliary countershaft gear fixed to the auxiliary countershaft for rotation therewith;

an output shaft having a range gear selectively coupleable thereto; and a two-way synchronizer coupling means fixed for rotation with the output shaft for mutually exclusively coupling only one of the intermediate shaft output gear and the range gear to the output shaft.

4. The transmission of claim 2 wherein the auxiliary countershaft is selectively drivingly engageable to the main countershaft via a clutch assembly fixed to the auxiliary countershaft for rotation therewith.

5. The transmission of claim 4 wherein the clutch assembly comprises a two position clutch having a first position for coupling the auxiliary countershaft to the main countershaft and a second position for coupling the auxiliary countershaft to the auxiliary drive gear.

6. The transmission of claim 5 further comprising control means for positioning the clutch assembly in a selected one of the two positions.

7. A compound vehicular transmission for providing a plurality of selectable speed ratios between an input shaft and an output shaft, the transmission comprising:

an intermediate shaft disposed between the input and output shafts;

a main countershaft;

a first splitter gear coaxial with and selectively engageable to the input shaft;

a second splitter gear coaxial with the input shaft and the intermediate shaft and selectively engageable to at least one of the input shaft and the intermediate shaft;

a plurality of intermediate shaft drive gears selectively coupleable to the intermediate shaft;

a plurality of main countershaft gears fixed for rotation with the main countershaft, each of the main countershaft gears being in continuous meshing engagement with a corresponding one of the first and second splitter gears and the plurality of intermediate shaft drive gears;

an intermediate shaft output gear fixed for rotation with the intermediate shaft;

an output shaft range gear selectively engageable to the output shaft for selective rotation therewith;

a two-way synchronizer coupling means fixed for rotation with the output shaft and operable for coupling only one of the intermediate shaft output gear and the output shaft range gear to the output shaft;

an auxiliary countershaft assembly comprising an auxiliary countershaft, a first auxiliary countershaft gear fixed to the auxiliary countershaft and in continuous meshing engagement with the output shaft range gear, and a second auxiliary countershaft gear surrounding said auxiliary countershaft and in continuous meshing engagement with the intermediate shaft output gear; and a clutch assembly fixed for rotation on the auxiliary countershaft and having a first position for coupling said auxiliary countershaft to said main countershaft and a second position for coupling the second auxiliary countershaft gear to the auxiliary countershaft.

8. The transmission of claim 7 wherein the clutch assembly includes an actuating means for positioning the clutch assembly.

9. The transmission of claim 7 wherein the plurality of main countershaft gears includes first and second main countershaft gears, the plurality of selectable speed ratios includes a plurality of selectable forward speed ratios having a plurality of substantially equal transmission ratio steps therebetween, the ratio of the first splitter gear to the first main countershaft gear being less than unity, and wherein:

each of the plurality of transmission ratio steps is about equal to (A/D)×(E/B); and each of the plurality of transmission ratio steps raised to a power equal to 2*N is about equal to (C/F)×(E/B), where A=number of teeth on the first splitter gear, B=number of teeth on the second splitter gear, C=number of teeth on the output shaft range gear, D=number of teeth on the first main countershaft E=number of teeth on the second main countershaft gear, F=number of teeth on the first auxiliary countershaft gear, and N=total number of forward speed ratios available on the intermediate shaft.

10. A compound vehicular transmission for providing a plurality of selectable speed ratios between an input shaft and an output shaft, the transmission comprising:

an intermediate shaft disposed between the input and output shafts;

a main countershaft;

a first splitter gear coaxial with the input shaft and selectively engageable thereto;

a second splitter gear coaxial with the input shaft, selectively engageable with at least one of the input shaft and the intermediate shaft;

a two-speed friction clutch splitter having a first position for coupling the input shaft to the first splitter gear, a second position for coupling the input shaft to the second splitter gear, and a third position for decoupling the first and second splitter gears from the input shaft;

a plurality of intermediate shaft drive gears selectively engageable to the intermediate shaft for rotation therewith;

a plurality of main countershaft gears fixed for rotation with the main countershaft, each of the plurality of main countershaft gears being in continuous meshing engagement with a corresponding one of the first and second splitter gears and the plurality of intermediate shaft drive gears;

an intermediate shaft output gear fixed for rotation with the intermediate shaft;

an output shaft range gear coaxial with and selectively engageable to the output shaft;

a two-way synchronizer coupling means fixed for rotation with the output shaft and operable for coupling one of the intermediate shaft output gear and the output shaft range gear to the output shaft;

an auxiliary countershaft assembly comprising an auxiliary countershaft, a first auxiliary countershaft gear fixed to the auxiliary countershaft and in continuous meshing engagement with the output shaft range gear, and a second auxiliary countershaft gear coaxial with said auxiliary countershaft and in continuous meshing engagement with the intermediate shaft output gear; and a clutch assembly fixed for rotation with the auxiliary countershaft and having a first position for coupling said auxiliary countershaft to said main countershaft.

11. The transmission of claim 10 wherein the clutch assembly further includes a second position for selectively coupling the second auxiliary countershaft gear to the auxiliary countershaft.

12. The transmission of claim 11 wherein the clutch assembly includes an actuating means for positioning the clutch assembly.

13. The transmission of claim 10 wherein the plurality of main countershaft gears includes first and second main countershaft gears, the plurality of selectable speed ratios includes a plurality of selectable forward speed ratios having a plurality of substantially equal transmission ratio steps therebetween, the ratio of the first splitter gear to the first main countershaft gear is greater than unity, and wherein:

each of the plurality of transmission ratio steps is approximately equal to (D/A)×(E/B); and each of the plurality of transmission ratio steps raised to a power equal to 2*N is approximately equal to (C/F)×(E/B), where A=number of teeth on the first splitter gear, B=number of teeth on the second splitter gear, C=number of teeth on the output shaft range gear, D=number of teeth on the first main countershaft gear, E=number of teeth on the second main countershaft gear, F=number of teeth on the first auxiliary countershaft gear, and N=total number of selectable forward speed ratios utilized.

* * * * *

UNITED STATES PATENT AND TRADEMARK OFFICE
CERTIFICATE OF CORRECTION

PATENT NO. : 5,511,437
DATED : April 30, 1996
INVENTOR(S) : EUGENE R. BRAUN

It is certified that error appears in the above-identified patent and that said Letters Patent is hereby corrected as shown below:

Column 4, Line 3,        "2b" should be --3b--; after "2a" delete ",".

Column 10, Line 66,      After "invention" insert --is--.

Column 13, Line 17,      After "C/F)", "=" should be --~--.

Signed and Sealed this

Twenty-second Day of October, 1996

Attest:

BRUCE LEHMAN

*Attesting Officer*        *Commissioner of Patents and Trademarks*